United States Patent
Phukan et al.

(10) Patent No.: US 8,779,012 B2
(45) Date of Patent: Jul. 15, 2014

(54) BIODEGRADABLE POLYORGANOSILOXANE DEMULSIFIER COMPOSITION AND METHOD FOR MAKING THE SAME

(75) Inventors: Monjit Phukan, Bangalore (IN); Anubhav Saxena, Bangalore (IN); Mayank Kumar Dubey, Bangalore (IN); Antonio Palumbo, Siracusa (IT); Kalman Koczo, Suffern, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 528 days.

(21) Appl. No.: 13/165,085

(22) Filed: Jun. 21, 2011

(65) Prior Publication Data
US 2012/0329887 A1    Dec. 27, 2012

(51) Int. Cl.
B01D 17/00    (2006.01)

(52) U.S. Cl.
USPC ......................................................... 516/135

(58) Field of Classification Search
None
See application file for complete search history.

(56) References Cited

U.S. PATENT DOCUMENTS

| | | | |
|---|---|---|---|
| 4,596,653 A * | 6/1986 | Graham et al. | 208/188 |
| 4,636,552 A | 1/1987 | Gay et al. | |
| 4,663,413 A | 5/1987 | Ward et al. | |
| 4,812,518 A | 3/1989 | Haubennestel et al. | |
| 5,004,559 A | 4/1991 | Koener et al. | |
| 5,100,991 A | 3/1992 | Cray et al. | |
| 5,179,142 A | 1/1993 | Ono et al. | |
| 5,583,246 A | 12/1996 | Aida et al. | |
| 6,001,140 A | 12/1999 | Grabowski et al. | |
| 6,221,815 B1 | 4/2001 | Grabowski et al. | |
| 7,745,501 B2 * | 6/2010 | Koczo et al. | 516/144 |

FOREIGN PATENT DOCUMENTS

| | | |
|---|---|---|
| WO | 2007/149537 A2 | 12/2007 |
| WO | 2009/094221 A1 | 7/2009 |
| WO | 2011/064255 A1 | 6/2011 |

* cited by examiner

*Primary Examiner* — Robert S Loewe
(74) *Attorney, Agent, or Firm* — Dominick G. Vicari; Joseph S. Ostroff

(57) ABSTRACT

There is provided herein a demulsifying composition comprising at least one polyorganosiloxane compound having the general formula (I):

$$M^1{}_a M^2{}_b D^1{}_c D^2{}_d T^1{}_e T^2{}_f Q_g \qquad (I)$$

wherein: $M^1 = R^1 R^2 R^3 SiO_{1/2}$, $M^2 = R^4 R^5 R^L SiO_{1/2}$, $D^1 = R^6 R^7 SiO_{2/2}$, $D^2 = R^8 R^L SiO_{2/2}$, $T^1 = R^9 SiO_{3/2}$, $T^2 = R^L SiO_{3/2}$, $Q = SiO_{4/2}$, where $R^1$, $R^2$, $R^3$, $R^4$, $R^5$, $R^6$, $R^7$, $R^8$ and $R^9$ are each independently chosen from monovalent alkyl, aryl or aralkyl hydrocarbon radicals, or chosen from $R^P$; $R^P$ is a monovalent polyether radical independently of the general formula (II):

$$-(C_nH_{2n})-O-(C_2H_4O)_o-(C_3H_6O)_p-(C_4H_8O)_q-R^{10} \qquad (II)$$

$R^L$ is a monovalent radical independently chosen from the general formula (III):

$$-X-O-(C_2H_4O)_r-(C_3H_6O)_s-(C_4H_8O)_t-\{C(O)C_uH_{2u}O\}_v-R^{11} \qquad (III)$$

There is also provided herein a method for separating emulsions comprising combining the components of the demulsification composition into a mixture; allowing the mixture to separate into at least two phases and separating said at least two phases from each other.

19 Claims, No Drawings

BIODEGRADABLE POLYORGANOSILOXANE DEMULSIFIER COMPOSITION AND METHOD FOR MAKING THE SAME

FIELD OF THE INVENTION

The present invention relates to demulsifier compositions, more specifically biodegradable polyorganosiloxane demulsifier compositions, such as those which are useful in the oil and gas industries. The present invention is also directed to methods for making demulsifier compositions.

BACKGROUND OF THE INVENTION

Any publications or references discussed herein are presented to describe the background of the invention and to provide additional detail regarding its practice. Nothing herein is to be construed as an admission that the inventors are not entitled to antedate such disclosure by virtue of prior invention.

Demulsifiers are used as process aids in crude oil production to separate the emulsified water from produced oil. Conventional demulsifiers are typically polymeric and interfacially-active. Many of these materials are non-biodegradable and some of them can be environmentally undesirable. Due to increased eco-toxicological constraints, current industry focus has been to use more biodegradable and less toxic materials for these applications.

Some silicones are also increasingly being used in the oil and gas industry for various applications, such as for antifoam applications and for the dewatering of crude oil. But there still exists a demand for silicones which can provide high performance demulsification while also providing enhanced biodegradability.

SUMMARY OF THE INVENTION

One objective of the present invention is directed to a demulsifying composition comprising (a) an emulsion; and (b) a demulsifying-effective amount of at least one polyorganosiloxane compound having the general formula (I):

$$M^1_a M^2_b D^1_c D^2_d T^1_e T^2_f Q_g \qquad (I)$$

wherein:
$M^1 = R^1 R^2 R^3 SiO_{1/2}$,
$M^2 = R^4 R^5 R^L SiO_{1/2}$,
$D^1 = R^6 R^7 SiO_{2/2}$,
$D^2 = R^8 R^L SiO_{2/2}$,
$T^1 = R^9 SiO_{3/2}$,
$T^2 = R^L SiO_{3/2}$,
$Q = SiO_{4/2}$, where $R^1$, $R^2$, $R^3$, $R^4$, $R^5$, $R^6$, $R^7$, $R^8$ and $R^9$ are each independently chosen from monovalent alkyl, aryl or aralkyl hydrocarbon radicals containing 1 to 60 carbon atoms, optionally containing at least one heteroatom, or at least one monovalent polyether radical having the general formula $R^P$;

$R^P$ is a monovalent polyether radical of the general formula (II):

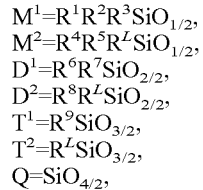

(II)

where $R^{10}$ is hydrogen or a monovalent alkyl radical containing from 1 to about 20 carbon atoms or an acyl group;

subscripts a, b, c, d, e, f and g are zero or positive integers, subject to the limitations: $2 \leq a+b+c+d+e+f+g \leq 500$, $b+d+f \geq 1$ and $a+b=2+e+f+2g$;

subscript n is 2 to about 10;
subscript o is 0 to about 200;
subscript p is 0 to about 200;
subscript q is 0 to about 200; and,
subject to the limitation $o+p+q \geq 1$;

$R^L$ is a monovalent radical independently chosen from the general formula (III):

(III)

where $R^{11}$ is hydrogen or monovalent alkyl radical containing from 1 to about 20 carbon atoms or an acyl group, and where X is a linear, branched or cyclic divalent hydrocarbon or aralkyl radical containing from about 2 to about 20 carbon atoms, optionally containing at least one heteroatom;

subscript r is 0 to about 200;
subscript s is 0 to about 200;
subscript t is 0 to about 200;
subscript u is 1 to about 20;
subscript v is 1 to about 200, and
subject to the limitation if r+s+t is equal to zero then the polyorganosiloxane contains at least one $R^P$ radical.

One other objective of the present invention is directed to a method for separating an emulsion comprising:

(i) combining the components of the herein described demulsification composition into a mixture;

(ii) allowing the demulsification composition mixture to separate into at least two phases; and (iii) separating said at least two phases from each other.

Either on a continuous or intermittent basis, one or more of the separated phases are isolated, cleaned and prepared for industrial use in the mining and/or petroleum industries or as oil itself for its own uses.

The present invention is further described in the detailed description section provided below.

DETAILED DESCRIPTION OF THE INVENTION

It has been unexpectedly discovered by the inventors herein that the herein described demulsifying-effective amount of at least one polyorganosiloxane compound (b) can effectively demulsify an emulsion (a) in a manner which renders one or more phases of the demulsified emulsion (a) suitable for use in various industries, or as oil itself, and also renders one or more phases of the demulsified emulsion (a) suitable for discharge and/or disposal in a manner which is environmentally and/or ecologically favorable.

As used in the specification and including the appended claims, the singular forms "a," "an," and "the" include the plural, and reference to a particular numerical value includes at least that particular value, unless the context clearly dictates otherwise.

Ranges expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The use of polyorganosiloxane compound (b) herein can effectively be used to demulsify emulsions such as those which are obtained from oil and gas applications and industries, inter alia, such as those described herein. In one non-limiting example the polyorganosiloxane (b) can be combined with an emulsion of oil and water obtained from crude oil production as the component (a) (the combination of (a) and (b) forming the demulsifying composition described herein) in order to demulsify component (a) into separate phases of oil and water and permit ecologically sounds means of dehydrating crude oil. The demulsifying compositions and methods of demulsification as described herein are deemed highly desirable and valuable as means for demulsification in the oil and gas industries, inter alia, i.e., to provide for separation of various emulsified phases found in industrially developed emulsions.

The composition, and method of separating the same, and its uses are further described in greater detail below.

The present invention is directed to a demulsifying composition comprising a blend of (a) an emulsion; and (b) a demulsifying-effective amount of at least one polyorganosiloxane compound having the general formula (I):

$$M^1{}_aM^2{}_bD^1{}_cD^2{}_dT^1{}_eT^2{}_fQ_g \qquad (I)$$

wherein:
$M^1=R^1R^2R^3SiO_{1/2}$,
$M^2=R^4R^5R^LSiO_{1/2}$,
$D^1=R^6R^7SiO_{2/2}$,
$D^2=R^8R^LSiO_{2/2}$,
$T^1=R^9SiO_{3/2}$,
$T^2=R^LSiO_{3/2}$,
$Q=SiO_{4/2}$, and $R^1$, $R^2$, $R^3$, $R^4$, $R^5$, $R^6$, $R^7$, $R^8$ and $R^9$ are each independently chosen from monovalent alkyl, aryl or aralkyl hydrocarbon radicals containing 1 to 60 carbon atoms, more specifically from 1 to about 20 carbon atoms, even more specifically from 1 to about 12 carbon atoms, and most specifically from 1 to about 8 carbon atoms, optionally containing at least one heteroatom, or at least one monovalent polyether radical having the general formula $R^P$;

more specifically $R^1$ is $CH_3$, OH, $OCH_3$ or $OC_2H_5$;
$R^2$, $R^3$, $R^6$, $R^7$ and $R^9$ are $CH_3$ or $R^P$; and,
$R^4$, $R^5$ and $R^8$ are $CH_3$;

$R^P$ is a monovalent polyether radical of the general formula (II):

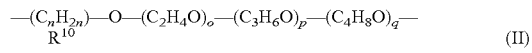

$$—(C_nH_{2n})—O—(C_2H_4O)_o—(C_3H_6O)_p—(C_4H_8O)_q— \\ R^{10} \qquad (II)$$

where $R^{10}$ is hydrogen or a monovalent alkyl radical containing from 1 to about 20 carbon atoms, more specifically from 1 to about 10 carbon atoms, and most specifically, from 1 to about 8 carbon atoms, or an acyl group;

subscripts a, b, c, d, e, f and g are zero or positive integers, subject to the limitations: $2 \leq a+b+c+d+e+f+g \leq 500$, $b+d+f \geq 1$ and $a+b=2+e+f+2g$;

subscript n is 2 to about 10, specifically 3 to about 10 and more specifically 3 to about 6;

subscript o is 0 to about 200, specifically 0 to about 100 and more specifically 0 to about 50;

subscript p is 0 to about 200, specifically 0 to about 100 and more specifically 0 to about 50;

subscript q is 0 to about 200, specifically 0 to about 50 and more specifically 0 to about 10; subject to the limitation $o+p+q \geq 1$;

$R^L$ is a monovalent radical independently chosen from the general formula (III):

$$—X—O—(C_2H_4O)_r—(C_3H_6O)_s—(C_4H_8O)_t— \\ \{C(O)C_uH_{2u}O\}_v—R^{11} \qquad (III)$$

$R^{11}$ is hydrogen or monovalent alkyl radical containing from 1 to about 20 carbon atoms, specifically from 1 to about 10 carbon atoms, or more specifically from 1 to about 8 carbon atoms, or an acyl group;

X is a linear, branched or cyclic divalent hydrocarbon or aralkyl radical containing from about 2 to about 20 carbon atoms, more specifically from about 2 to about 15 carbon atoms and most specifically from about 3 to about 10 carbon atoms, optionally containing at least one heteroatom;

subscript r is 0 to about 200, specifically 0 to about 100, and more specifically 0 to about 50 and even more specifically 1 to about 50;

subscript s is 0 to about 200, specifically 0 to about 100, and more specifically 0 to about 25 and even more specifically 1 to about 25;

subscript t is 0 to about 200, specifically 0 to about 50, and more specifically 0 to about 10 and even more specifically 1 to about 10;

subscript u is 1 to about 20, specifically 1 to about 15, and more specifically 1 to about 10;

subscript v is 1 to about 200, specifically 1 to about 100, and more specifically 1 to about 50;

subject to the limitation if $r+s+t$ is equal to zero then the polyorganosiloxane contains at least one $R^P$ radical.

In another specific embodiment of the invention, the polyorganosiloxane compound in component (b) has the general formula (IV)

$$M^1{}_aM^2{}_bD^1{}_cD^2{}_d \qquad (IV)$$

where
$M^1=R^{12}R^{13}R^{14}SiO_{1/2}$,
$M^2=R^{15}R^{16}R^LSiO_{1/2}$,
$D^1=R^{17}R^{18}SiO_{2/2}$,
$D^2=R^{19}R^LSiO_{2/2}$, where, $R^{12}$, $R^{13}$, $R^{14}$, $R^{15}$, $R^{16}$, $R^{17}$, $R^{18}$ and $R^{19}$ are each independently chosen from monovalent alkyl, aryl or aralkyl hydrocarbon radicals containing 1 to 60 carbon atoms, specifically from 1 to about 20 carbon atoms, and most specifically from 1 to about 8 carbon atoms, optionally containing at least one heteroatom, or chosen from $R^P$;

more specifically $R^{12}$ is $CH_3$, OH, $OCH_3$ or $OC_2H_5$;
$R^{13}$, $R^{14}$, $R^{17}$ and $R^{18}$ are $CH_3$ or $R^P$;
$R^{15}$, $R^{16}$ and $R^{19}$ are each $CH_3$;

subscripts a, b, c and d are zero or positive integers, subject to the limitations: 2≤a+b+c+d≤500, and b+d≥1;

more specifically, $R^P$ is a monovalent polyether radical of the general formula (V):

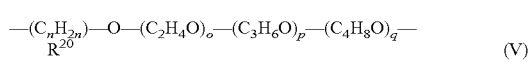

(V)

where subscript n is 2 to about 10, specifically 3 to about 10, and more specifically 3 to about 6;

subscript o is 0 to about 200, specifically 0 to about 100, and more specifically 0 to about 50 and even more specifically 1 to about 25;

subscript p is 0 to about 200, specifically 0 to about 100, and more specifically 0 to about 50 and even more specifically 1 to about 25;

subscript q is 0 to about 200, specifically 0 to about 50, and more specifically 0 to about 10 and even more specifically 1 to about 10; and, subject to the limitation o+p+q≥1;

where $R^{20}$ is hydrogen or a monovalent alkyl radical containing from 1 to about 20 carbon atoms, more specifically from 1 to about 10 carbon atoms, or most specifically from 1 to about 8 carbon atoms, or an acyl group;

$R^L$ is a monovalent radical of the general formula (VI):

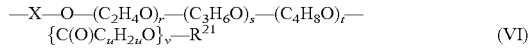

(VI)

where X is a divalent radical comprising of linear, branched or cyclic hydrocarbon radical or aralkyl radical of from about 2 to about 20 carbon atoms, more specifically from about 2 to about 15 carbon atoms and most specifically from about 3 to about 10 carbon atoms, optionally containing at least one heteroatom;

$R^{21}$ is hydrogen or monovalent alkyl radical containing from 1 to about 20 carbon atoms, more specifically from 1 to about 12 carbon atoms, and most specifically from 1 to about 8 carbon atoms, or an acyl group;

subscript r is 0 to about 200, specifically 0 to about 100, and more specifically 0 to about 50 and even more specifically 1 to about 25;

subscript s is 0 to about 200, specifically 0 to about 100, and more specifically 0 to about 50 and even more specifically 1 to about 25;

subscript t is 0 to about 200, specifically 0 to about 50, and more specifically 0 to about 10 and even more specifically 1 to about 10;

subscript u is 1 to about 20, specifically 1 to about 15, and more specifically 1 to about 10;

subscript v is 1 to about 200, specifically 1 to about 100, and more specifically 1 to about 50;

subject to the limitation if r+s+t is equal to zero then the polyorganosiloxane contains at least one $R^P$ radical.

In yet another specific embodiment herein the moiety —C(O)$C_uH_{2u}$O— of formulae (III) and (VI) can each independently be selected from the group consisting of glycolide {—C(O)CH$_2$O—}, lactide {—C(O)CH(CH$_3$)O—}, butyrolactide {—C(O)CH$_2$CH$_2$CH$_2$O—} and caprolactide {—C(O)CH$_2$CH$_2$CH$_2$CH$_2$CH$_2$O—} radicals.

The expression "hydrocarbon radicals" means any hydrocarbon group from which one or more hydrogen atoms have been removed and is inclusive of alkyl, alkenyl, alkynyl, cyclic alkyl, cyclic alkenyl, cyclic alkynyl, aryl, aralkyl and arenyl, and optionally it is substituted with oxygen, nitrogen, or sulfur. The term "alkyl" means any monovalent, saturated, straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl. Examples of aryls include phenyl, methylphenyl and ethylphenyl. Examples of cycloalkyl radicals include cyclohexyl, cycloheptyl and cyclooctyl. Examples of cyclic alkyls include cycloheptyl, cyclohexyl and cyclopentyl, examples of cyclic alkenyls include cycloheptenyl, cyclohexenyl and cyclopentenyl and examples of cyclic alkynyls include cycloheptynyl, cyclohexynyl and cyclopentynyl radicals.

The emulsion component (a) of the present invention contains at least two, immiscible or partially miscible liquids, one of them non-polar (oil phase) and another is a polar liquid, specifically water-based. Either the non-polar or the polar liquid can form the discontinuous phase, typically in the form of liquid drops. The emulsion (a) can be, for example, a water-in-oil, or an oil-in-water emulsion. In addition, it is also possible to prepare emulsions of emulsions and these are generally known as multiple emulsions, such as water-in-oil-in-water, oil-in-water-in-oil etc. The drop sizes of the discontinuous (emulsified) component is in the range of about 0.1 microns up to about 500 microns and more typically in the range of about 1 to about 100 microns. The emulsified component can be unstabilized, but is more typically stabilized by a stabilizing amount of a surfactant, a polymer and/or dispersed particulate solid. Methods of emulsification are well known in the art and shall not be detailed herein. In one embodiment, the non-polar (oil-phase) can be any of those oil phase materials which are found in the emulsions which are obtained from the industrial applications described herein.

For the purpose of this disclosure, the term "immiscible" means that the two liquids have no or limited (less than about 0.1%) solubility in each other.

The aqueous phase can be essentially pure water, or alternatively, water with varying amounts of solid (particulate) materials, minerals, salts or other chemicals. In one embodiment, such solid (particulate) materials, minerals, salts or other chemicals can be those which are found in the emulsions which are obtained from the industrial applications described herein.

The oil phase, for example, can be composed of one or more hydrophobic chemicals, typically liquids, which individually or in combination are mainly insoluble in the aqueous phase. Such hydrophobic chemicals can be, for example, linear or branched, cyclic or acyclic, saturated or unsaturated, aliphatic or aromatic hydrocarbons. The hydrocarbons of the subject disclosure typically contain at least about six carbon atoms and can be unsubstituted, or alternatively, substituted with one or more heteroatom-containing groups (e.g., hydroxyl, amino, carboxyl, amide, anhydride, ester, or ether groups) as long as the hydrocarbons remain mainly insoluble with the aqueous phase.

Some examples of oil phases include, but are not limited to, halogenated or non-halogenated hydrocarbons having about 2 to about 30 carbons atoms, and more particularly, halogenated or non-halogenated ethenes, butadienes, pentanes, hexanes, heptanes, octanes, benzenes, toluene, thylbenzenes, xylenes, naphthalene, cresols, naphtha, fats, lubrication oils, petroleum, gasoline, diesel fuel, crude oil, fuel oils, jet fuels, heating oils, cleaning oils, vegetable oils, mineral oils, crude oil, gas condensates and tar or bitumen derivatives.

Further, emulsion (a) may also contain gases and solids, such as methane gas, nitrogen, air, sand, clay particles etc.

The demulsifying composition can contain polyorganosiloxane (b) in a demulsifying effective amount, which may vary depending on the specific emulsion and/or the industrial application from which the emulsion (a) has been obtained, and the relative amount of the emulsion (a), which is to be demulsified. Those skilled in the art will be able to vary the amount of polyorganosiloxane (b) depending on the desired degree of demulsification and the contents of the emulsion (a). In one non-limiting embodiment, the polyorganosiloxane (b) can be used in an amount of from 0.1 parts per million (ppm) to about 10,000 ppm, more specifically from 0.1 ppm to about 1,000 ppm and most specifically from about 0.1 ppm to about 500 ppm.

Other optional ingredients which may be added to the demulsifying composition herein includes coupling agents, e.g., silane coupling agents, curing aids, e.g., including activators, retarders and accelerators, processing additives such as oils, plasticizers, tackifying resins, silicas, other fillers, pigments, fatty acids, zinc oxide, waxes, antioxidants and antiozonants, peptizing agents, reinforcing materials such as, for example, carbon black; wetting agents, anticorrosion additives, hydrogen sulfide scavengers, biocides and so forth. Such additives are selected based upon the intended use and such selection is within the knowledge of one of skill in the art, as are the required amounts of such additives known to one of skill in the art.

The incorporation of the demulsifier (b) into the emulsion (a) to be separated can be achieved by any method known in the art for integrally mixing the demulsifier with the emulsion. The mixing procedure can use, for example, standard mixers, high-speed mixers or blenders, or shakers. The temperature can be unadjusted within room temperature limits (~20-40° C.), or adjusted as required, for example, to 40-150° C. for a suitable amount of time.

The demulsification of emulsion (a) by polyorganosiloxane (b) can be conducted in any of the herein described mixing procedures or those which are known in the art, and specifically wherein the noted mixers, blenders or shakers are located in a continuous or batch production line and/or within a larger industrial apparatus.

Emulsions can create problems in many industrial applications because emulsions often do not separate into the liquid components for a prolonged time. In this case typically demulsifying agents are added to initiate, accelerate and complete the separation process. Demulsifying agents break emulsions and mixtures of polar solutes like water, and non-polar solvents like oil.

Demulsifying agents are used to separate emulsions into polar (typically water) and non-polar liquids by incorporating the demulsifying agent into the emulsion. Some such demulsifying agents which may be added to the demulsifying composition herein comprise blends of surface-active chemicals, such as organic demulsifiers which may include, but are not limited to sulfonates, sulfosuccinates, esters, polyol esters, polyester amines, polymeric elastomers, sulfated polyol ester, oxyalkylated phenolic resins, alkylphenol alkoxylates, amine alkoxylates, quaternary amines, ethoxylated amines, bisamides, polyalkylene glycols, polymerized polyols, resin esters, polyether polyols, resin alkoxylates, modified polyols, polyimine alkoxylates and diepoxides.

The demulsifying composition can be used independently or accompanied by additional silicone and/or organic demulsifiers (demulsifying agents) which can be utilized in the form of a blend, a solution, a dispersion, or either an oil-in-water or a water-in-oil emulsion or microemulsion, or the various demulsifying agents can be added separately. When the demulsifier (b) and any other additional silicone and/or organic demulsifiers are applied they may be applied in solution suitable solvents which can be selected from linear or branched, cyclic or acyclic, saturated or unsaturated, aliphatic or aromatic hydrocarbons, alcohol, ketones, esters, ethers and their blends or whatever solvent is commonly used in the particular application.

When the organic and/or silicone demulsifier is included, the weight ratio of the weight of the demulsifier composition to the total weight amount of organic and silicone demulsifier is typically in the range of about 100:1 to about 1:1000, more typically in the range of about 5:1 to about 1:200.

The demulsifying compositions herein may be utilized in a vast array of industrial and commercial application wherever the separation of an emulsion such as the herein described emulsion (a) may be desired or needed. Some non-limiting examples of such applications may be mining and petroleum processing applications.

A typical application of the demulsifying compositions described herein are for the separation of crude oil emulsions, i.e., emulsion (a) may be in one embodiment a crude oil emulsion. During extraction and production of crude oil, water or brine gets emulsified into the crude oil yielding a water-in-oil emulsion, which can be unstabilized or stabilized by surface active materials, organic solids, such as asphaltenes and resins, or inorganic solids. This water-in-oil emulsion gives rise to several down-stream problems; corrosion during refinery processes, disruption of distillation processes and greater energy requirement to pump the more viscous emulsion are to name a few. Thus, demulsifiers are extensively used in the petroleum industry to break water-in-oil and oil-in-water emulsions; and before transportation, refining or processing the water content of the crude oil has to be reduced to pipeline specification levels (typically less than 0.05-2%) and this is typically achieved by injecting demulsifiers into the well, into the crude oil stream, at the separation equipment or at any other suitable points.

The organopolysiloxane (b) described herein improves demulsifying action when the emulsion (a) is obtained from those industries/applications selected from the non-limiting group consisting of the mining and petroleum industry, both in the oil field and refineries, including, but not limited to desalters; bitumen extraction from oils sands (separating bitumen froth and solvent diluted bitumen emulsions); in steam assisted gravity drainage (SAGD); in enhanced oil recovery with surfactants and/or polymers or using supercritical carbon dioxide; in the separation of waste oils, slop oils, sludges, such as oily waste from desalters, waste water skimmings, refinery and petrochemical plant waste (tank bottom washes, coker drum waste, "dirty bleeds" etc.), steel and aluminum industrial waste, including synthetic lubes, high lithium grease, lube oil from rollers, metalworking fluid waste and paper plant waste.

The polyorganosiloxane (b) can be used for demulsification and antifoaming in gas/oil/water separators which contain emulsion (a).

Other emulsions (a) which are suitable for dehazing (demulsification) can be those containing one or more of lubrication oils and lubrication oil waste, such as automotive waste (motor oil etc.) or bunker oil.

Another typical industrial use of the present invention is diesel fuel (including bio-diesel) dehazing where the polyorganosiloxane (b) separates small amounts of emulsified water from the diesel fuel (emulsion (a)) and can also provide for diesel fuel antifoaming.

The polyorganosiloxane (b) of the demulsifying composition herein can be used to improve ore recovery from mining operations. The application of the polyorganosilxoane (b) of the demulsifying composition herein to mining processes such as flocculation, separation, purification, concentration, leaching & chemical extraction improves the separation of minerals from their gangue. Thus, emulsion (a) can further include, emulsions that are produced or present in such mining processes.

Further applications of polyorganosiloxane (b) of the demulsifying composition can be in oil and gas applications including the utilization as asphaltene dispersants and to improve drag reduction. Thus, emulsion (a) can further include, emulsions that are produced or present in such oil and gas applications.

In one embodiment following the combination of the components of the demulsification composition into a mixture, the demulsification mixture is allowed to separate into at least two phases, e.g., the oil phase and the water (aqueous) phase. The oil phase and water phase can then be separated by any known means of separation including decanting, centrifugation, filtration, electric field, distilling etc.

The separated oil phase can either be utilized in industry such as in the case of crude oil or alternatively, discarded or disposed of in a suitable manner. In one embodiment, the separated oil phase can be recycled to a process or application from which it was obtained. The separated water phase can be discarded, disposed or discharged in any suitable manner.

The currently used demulsifiers (both the organic and especially the silicone based materials) very often pose environmental danger because they have poor biodegradability in the environment, for example in sea water. In one embodiment, the polyorganosiloxane (b) demulsifier will have and improved biodegradability over the current silicone demulsifiers.

In one embodiment the polyorganosiloxane compound (b) has a sea water biodegradability of at least 10%, specifically at least 15%, more specifically at least 18% in 28 days when tested according to OECD 306 guidelines.

In one specific embodiment, crude oil (or any component (a) described herein) that has been treated with polyorganosiloxane (b) can contain less than 2% by weight of water, specifically less than 1% by weight of water, and more specifically less than 0.5% by weight of water after separation of the water phase from the oil phase.

Preparative examples 1-10, 24 and 25 are intermediates and comparative examples, the other Examples are part of the invention.

EXAMPLES

Example 1

Polymethylhydrogen-co-dimethylsiloxane fluid with the average formula $(CH_3)_3Si(OSi(CH_3)_2)_{87}(OSi(H)(CH_3))_{7.4}OSi(CH_3)_3$ was prepared by acid catalyzed ring opening polymerization of polymethylhydrogensiloxane with the average formula $(CH_3)_3Si(OSi(H)(CH_3))_{36}OSi(CH_3)_3$, hexamethyldisiloxane (MM) and octamethylcyclotetrasiloxane ($D_4$); in the presence of concentrated $H_2SO_4$. The reaction was carried out by mixing 35.07 g of $(CH_3)_3Si(OSi(H)(CH_3))_{36}OSi(CH_3)_3$, 9.22 g hexamethyldisiloxane and 455.70 g octamethylcyclotetrasiloxane ($D_4$) and 2% of $H_2SO_4$ of total reaction mass for 4 hr, at ambient temperature, in a round bottom flask fitted with a condenser and an overhead stirrer. After 4 hr the acid was neutralized with 40 g $NaHCO_3$ and the salt was filtered out from the reaction mass. The final non-volatile content of the reaction mass was 90%, at 150° C. The average structure was determined by $^{29}Si$-NMR.

Example 2

Polymethylhydrogen-co-dimethylsiloxane fluid with the average formula $(CH_3)_3Si(OSi(CH_3)_2)_{87}(OSi(H)(CH_3))_{4.4}OSi(CH_3)_3$ was prepared by acid catalyzed ring opening polymerization of polymethylhydrogensiloxane with the average formula $(CH_3)_3Si(OSi(H)(CH_3))_{36}OSi(CH_3)_3$, hexamethyldisiloxane (MM) and octamethylcyclotetrasiloxane ($D_4$); using concentrated $H_2SO_4$. The reaction was carried out by mixing 26.47 g of $(CH_3)_3Si(OSi(H)(CH_3))_{36}OSi(CH_3)_3$, 11.76 g hexamethyldisiloxane and 561.76 g octamethylcyclotetrasiloxane ($D_4$) and 2% of $H_2SO_4$ of total reaction mass for 4 hr, at ambient temperature, in a round bottom flask fitted with a condenser and an overhead stirrer. After 4 hr the acid was neutralized with 51 g $NaHCO_3$ and the salt was filtered out from the reaction mass. The final non-volatile content of the reaction mass was 90%, at 150° C. The average structure was determined by $^{29}Si$-NMR.

Example 3

Polymethylhydrogen-co-dimethylsiloxane fluid with the average formula $(CH_3)_3Si(OSi(CH_3)_2)_{77}(OSi(H)(CH_3))_{8.85}OSi(CH_3)_3$ was prepared by acid catalyzed ring opening polymerization of polymethyl hydrogen siloxane with the average formula $(CH_3)_3Si(OSi(H)(CH_3))_{36}OSi(CH_3)_3$, hexamethyldisiloxane (MM) and octamethylcyclotetrasiloxane ($D_4$) using concentrated $H_2SO_4$. The reaction was carried out by mixing 28.21 g of $(CH_3)_3Si(OSi(H)(CH_3))_{36}OSi(CH_3)_3$, 5.84 g hexamethyldisiloxane and 265.93 g octamethylcyclotetrasiloxane ($D_4$) and 2% of $H_2SO_4$ of total reaction mass for 4 hr, at ambient temperature, in a round bottom flask fitted with a condenser and an overhead stirrer. After 4 hr the acid was neutralized with 25 g $NaHCO_3$ and the salt was filtered out from the reaction mass. The final non-volatile content of the reaction mass was 89% at 150° C. The average structure was determined by $^{29}Si$-NMR.

Example 4

Polymethylhydrogen-co-dimethylsiloxane fluid with the average formula $(CH_3)_3Si(OSi(CH_3)_2)_{70}(OSi(H)(CH_3))_{5.2}OSi(CH_3)_3$ was prepared by acid catalyzed ring opening polymerization of polymethyl hydrogen siloxane with the average formula $(CH_3)_3Si(OSi(H)(CH_3))_{36}OSi(CH_3)_3$, hexamethyldisiloxane (MM) and octamethylcyclotetrasiloxane ($D_4$) using concentrated $H_2SO_4$. The reaction was carried out by mixing 23.14 g of $(CH_3)_3Si(OSi(H)(CH_3))_{36}OSi(CH_3)_3$, 9.8 g hexamethyldisiloxane and 367.08 g octamethylcyclotetrasiloxane ($D_4$) and 2% of $H_2SO_4$ of total reaction mass for 4 hr, at ambient temperature, in a round bottom flask fitted with a condenser and an overhead stirrer. After 4 hr the acid was neutralized with 31g $NaHCO_3$ and the salt was filtered out from the reaction mass. The final non-volatile content of the reaction mass was 89% at 150° C. The average structure was determined by $^{29}Si$-NMR.

Example 5

Polymethylhydrogen-co-dimethylsiloxane fluid with the average formula $(CH_3)_3Si(OSi(CH_3)_2)_{20}(OSi(H)(CH_3))_{3.2}$ $OSi(CH_3)_3$ was prepared by acid catalyzed ring opening polymerization of polymethyl hydrogen siloxane with the average formula $(CH_3)_3Si(OSi(H)(CH_3))_{36}OSi(CH_3)_3$, hexamethyldisiloxane (MM) and octamethylcyclotetrasiloxane ($D_4$) using concentrated $H_2SO_4$. The reaction was carried out by mixing 65.90 g of $(CH_3)_3Si(OSi(H)(CH_3))_{36}OSi(CH_3)_3$, 48.43 g hexamethyldisiloxane and 487.66 g, octamethylcyclotetrasiloxane ($D_4$) and 2% of $H_2SO_4$ of total reaction mass for 4 hr, at ambient temperature, in a round bottom flask fitted with a condenser and stirring. After 4 hr the acid was neutralized with 31 g $NaHCO_3$ and the salt was filtered out from the reaction mass. The final non-volatile content of the reaction mass was 89% 150° C. The average structure was determined by $Si^{29}$-NMR.

Example 6

A silicone alkyl polyether with the average structure $(CH_3)_3SiO(Si(CH_3)_2O)_{87}(Si(R^P)(CH_3))_{4.6}(Si(R^o)(CH_3))_{2.9}OSi(CH_3)_3$; wherein $R^p$ is a polyether radical having the average structure $-CH_2CH_2CH_2O(CH_2CH_2O)_{18}H$ and $R^o$ is a n-octyl radical; was synthesized by hydrosilylation reaction between Example 1, 1-octene and a polyether with the average formula of $CH_2=CHCH_2O-(CH_2CH_2O)_{18}H$. A nitrogen blanketed glass reactor at atmospheric pressure, which was equipped with a temperature probe, an agitator, a condenser and a nitrogen inlet, was charged with 282 g of polysiloxane hydride from example 1. The reactor was heated to 72° C. and Karstedt's catalyst equivalent to 5 ppm, dissolved in 13.40 g of 1-octene, was added slowly to the reaction vessel. The reaction was exothermic and the reaction temperature rose to 105° C. within 2 minutes. The reaction was kept at 80° C. till completion and confirmed by Proton-NMR. After this 180.18 g of the allyl-started polyether above was added to the same reaction vessel at once, followed by Karstedt's catalyst equivalent to 5 ppm dissolved in 0.5 g of toluene. The reaction was again exothermic and the temperature rose to 110° C. The reaction mixture turned from a heterogeneous (whitish) to a homogeneous (clear) liquid and the heating was continued at 100° C. for 3 hr until all the hydride was consumed as confirmed by Proton-NMR. The copolymer was allowed to cool for 20 min and stored in container.

Example 7

A silicone polyether with the average structure $(CH_3)_3SiO(Si(CH_3)_2O)_{87}(Si(R^P)(CH_3)O)_{4.4}Si(CH_3)_3$, wherein $R^P$ is a polyether radical having the average structure $-CH_2CH_2CH_2O(CH_2CH_2O)_{18}H$, was synthesized by a hydrosilylation reaction between Example 2, and a polyether with the average formula of $CH_2=CHCH_2O(CH_2CH_2O)_{18}H$. A nitrogen blanketed glass reactor at atmospheric pressure, which was equipped with a temperature probe, an agitator, a condenser and a nitrogen inlet, was charged with 282 g of polysiloxane hydride from Example 2. The reactor was heated to 80° C. and 180.18 g of the allyl-started polyether noted above was added at once followed by addition of Karstedt's catalyst equivalent to 5 ppm, dissolved in 0.5 g of toluene. The reaction was exothermic and the temperature rose to 100° C. The reaction mixture turned from a heterogeneous (whitish) to a homogeneous (clear) liquid and the heating was continued at 100° C. for 3 hr until all of the hydrides were consumed as confirmed by Proton-NMR. The copolymer was allowed to cool for 20 min and stored in a container.

Example 8

A silicone polyether with the average structure $(CH_3)_3SiO(Si(CH_3)_2O)_{77}(Si(R^P)(CH_3)O)_{8.8}Si(CH_3)_3$, wherein $R^P$ is a polyether radical having the average structure $-CH_2CH_2CH_2O(CH_2CH_2O)_{18}H$, was synthesized by a hydrosilylation reaction between Example 3, and a polyether with the average formula of $CH_2=CHCH_2O(CH_2CH_2O)_{18}H$. A nitrogen blanketed glass reactor at atmospheric pressure, which was equipped with a temperature probe, an agitator, a condenser and a nitrogen inlet, was charged with 87.21 g of polysiloxane hydride from Example 3. The reactor was heated to 80° C. and 118.18 g of the allyl-started polyether noted above was added followed by addition of Karstedt's catalyst equivalent to 5 ppm, dissolved in 0.5 g of toluene. The reaction was exothermic and the temperature rose to 100° C. The reaction mixture turned from a heterogeneous (whitish) to a homogeneous (clear) liquid and the heating was continued at 100° C. for 3 hr until all of the hydrides were consumed as confirmed by Proton-NMR. The copolymer was allowed to cool for 20 min and stored in a container.

Example 9

A silicone polyether with the average structure $(CH_3)_3SiO(Si(CH_3)_2O)_{70}(Si(R^P)(CH_3)O)_{4.9}Si(CH_3)_3$, wherein $R^P$ is a polyether radical having the average formula $-CH_2CH_2CH_2O(CH_2CH_2O)_{18}H$, was synthesized by hydrosilylation reaction between Example 4, and a polyether with the average formula of $CH_2=CHCH_2O(CH_2CH_2O)_{18}H$. A nitrogen blanketed glass reactor at atmospheric pressure, which was equipped with a temperature probe, an agitator, a condenser and a nitrogen inlet, was charged with 112.72 g of polysiloxane hydride from Example 4. The reactor was heated to 80° C. and 98 g of the allyl-started polyether noted above was added followed by addition of Karstedt's catalyst equivalent to 5 ppm, dissolved in 0.5 g of toluene. The reaction was exothermic and the temperature rose to 100° C. The reaction mixture turned from a heterogeneous (whitish) to a homogeneous (clear) liquid and the heating was continued at 100° C. for 3 hr until all of the hydrides were consumed as confirmed by Proton-NMR. The copolymer was allowed to cool for 20 min and stored in a container.

Example 10

A silicone polyether with the average structure $(CH_3)_3Si(OSi(CH_3)_2)_{20}(OSi(R^P)(CH_3))_{3.2}OSi(CH_3)_3$, wherein $R^P$ is a polyether radical having the average formula $-CH_2CH_2CH_2O(CH_2CH_2O)_{7.4}H$, was synthesized by a hydrosilylation reaction between Example 5, and a polyether with the average formula of $CH_2=CHCH_2O(CH_2CH_2O)_{7.4}H$. A nitrogen blanketed glass reactor at atmospheric pressure, which was equipped with a temperature probe, an agitator, a condenser and a nitrogen inlet, was charged with 61g of polysiloxane hydride from Example 5. The reactor was then heated to 80° C. and 106.77 g of the allyl-started polyether noted above was added followed by addition of Karstedt's catalyst equivalent to 5 ppm, dissolved in 0.5 g of toluene. The reaction was exothermic and the temperature rose to 100° C. The reaction mixture turned from a heterogeneous (whitish) to a homogeneous (clear) liquid and the heating was continued at 100° C. for 3 hr until all of the hydrides were consumed as confirmed by Proton-NMR. The copolymer was allowed to cool for 20 min and stored in a container.

Example 11

A silicone polyether-co-caprolactone copolymer with the average structure $(CH_3)_3SiO(Si(CH_3)_2O)_{87}(Si(R^{pc})(CH_3)O)_{4.5}(Si(R^o)(CH_3)O)_{2.9}Si(CH_3)_3$ was prepared, wherein $R^{pc}$ is a polyether-co-caprolactone radical having the average formula —$CH_2CH_2CH_2O(CH_2CH_2O)_{18}(C(O)(CH_2)_5O)_{11}H$ and $R^o$ is n-octyl radical, as follows: In a three-necked round bottom flask equipped with a thermometer, a condenser with positive dry nitrogen flow and a stirrer; 110 g of a polyether siloxane copolymer of Example 6, 67.24 g of ε-Caprolactone and 0.05% of stannous octanoate relative to the total amount of reactants were taken and stirred at 80° C. for 2 hr. The reaction bath temperature was then increased to 150° C. and the reaction mass was held at this temperature for 4 hr. It was observed that the reaction mixture was an opaque, immiscible blend at the beginning of the reaction, which progressively became clearer during the high temperature step. The completion of the reaction was confirmed by proton NMR and solid weight analysis at 150° C. for 10 min, at the beginning and at the end of reaction, respectively. The reaction product was also analyzed by FTIR, which did not show an absorbance band for free lactones. GPC gave a Gaussian-shaped unimodal curve corresponding to the targeted molecular weight. A DSC thermogram showed the melting peak at 43° C. The resulting product was a hard and opaque solid at room temperature.

Example 12

A silicone polyether-co-lactide copolymer with the average structure $(CH_3)_3SiO(Si(CH_3)_2O)_{87}(Si(R^{pd})(CH_3)O)_{4.5}(Si(R^o)(CH_3)O)_{2.9}Si(CH_3)_3$ wherein $R^{pd}$ is a polyether-co-lactide radical having the average formula —$CH_2CH_2CH_2O(CH_2CH_2O)_{18}(C(O)CH(CH_3)O)_{18}H$ and $R^o$ is n-octyl radical, was prepared as follows: In a three-necked round bottom flask; equipped with a thermometer, a condenser with positive dry nitrogen flow and a stirrer; 100 g of a polyether siloxane copolymer of Example 6, 63.87 g of dl-dilactide, 10% of toluene and 0.05% of Stannous octanoate relative to the total amount of reactants were taken and stirred at 80° C. for 2 hrs. The reaction bath temperature was increased to 150° C. and the reaction mass was held at this temperature for 4 hr. It was observed that the reaction mixture was a low viscous liquid at the beginning of the reaction, which progressively became viscous during the high temperature step. The completion of the reaction was confirmed by proton NMR. The reaction product was also analyzed by FTIR, which did not show absorbance band for free lactide. GPC gave a Gaussian-shaped unimodal curve corresponding to the targeted molecular weight. The resulting product was a clear and highly viscous liquid at room temperature.

Example 13

A silicone polyether-co-caprolactone-co-lactide copolymer with the average structure $(CH_3)_3SiO(Si(CH_3)_2O)_{87}(Si(R^{pcd})(CH_3)O)_{4.5}(Si(R^o)(CH_3)O)_{2.9}Si(CH_3)_3$, wherein $R^{pcd}$ is a polyether-co-caprolactone-co-lactide radical having the average formula —$CH_2CH_2CH_2O(CH_2CH_2O)_{18}(C(O)CH(CH_3)O)_{10}(C(O)(CH_2)_4O)_6H$ and $R^o$ is n-octyl radical, was prepared as follows: In a three-necked round bottom flask; equipped with a thermometer, a condenser with positive dry nitrogen flow and a stirrer; 100 g of a polyether siloxane copolymer of Example 6 were taken. To this 28.38 g dl-dilactide, 28.08 g ε-Caprolactone and 0.05% of stannous octanoate relative to the total amount of reactants were added and stirred at 80° C. for 2 hr. The reaction bath temperature was increased to 150° C. and the reaction mass was held at this temperature for 4 hr. It was observed that the reaction mixture was a low viscous liquid at the beginning of the reaction, which progressively became highly viscous during the high temperature step. The completion of the reaction was confirmed by proton NMR. The reaction product was also analyzed by FTIR, which did not show an absorption band for free lactide/lactone. GPC gave a gaussian-shaped unimodal curve corresponding to the targeted molecular weight. The resulting product was a clear and highly viscous material at room temperature.

Example 14

A silicone polyether-co-caprolactone copolymer with the average structure $(CH_3)_3SiO(Si(CH_3)_2O)_{87}(Si(R^{pc})(CH_3)O)_{4.4}Si(CH_3)_3$, wherein $R^{pc}$ is a polyether-co-caprolactone radical having the average formula —$CH_2CH_2CH_2O(CH_2CH_2O)_{18}(C(O)(CH_2)_4O)_{11}H$, was prepared as follows: In a similar set of equipment, as mentioned on Example 13, 60 g of a polyether siloxane copolymer of Example 7 had 51.67 g of ε-Caprolactone and 0.05% of Stannous octanoate relative to the total amount of reactants added thereto, followed by stirring at 80° C. for 2 hr. The reaction bath temperature was increased to 150° C. and the reaction mass was held at this temperature for 4 hr. It was observed that the reaction mixture was a low viscous liquid at the beginning of the reaction, which progressively became highly viscous during the high temperature step. The completion of the reaction was confirmed by proton NMR and solid weight analysis at 150° C. for 10 min at the beginning and end of the reaction. The reaction product was also analyzed by FTIR, which did not show an absorption band for lactones. GPC gave a Gaussian-shaped unimodal curve corresponding to the targeted molecular weight. DSC showed the melting peak at 43° C., which confirms the copolymer formation. The resulting product was a hard and opaque solid at room temperature.

Example 15

A silicone polyether-co-lactide copolymer with the average structure $(CH_3)_3SiO(Si(CH_3)_2O)_{87}(Si(R^{pd})(CH_3)O)_{4.4}Si(CH_3)_3$, wherein $R^{pd}$ is a polyether-co-lactide radical having the average formula —$CH_2CH_2CH_2O(CH_2CH_2O)_{18}(C(O)CH(CH_3)O)_{18}H$, was prepared as follows: In a three-necked round bottom flask; equipped with a thermometer, a condenser with positive dry nitrogen flow and a stirrer; 100 g of a polyether siloxane copolymer of Example 7 were taken. To this 66.8 g of dl-dilactide, 10% of toluene and 0.05% of stannous octanoate relative to the total amount of reactants were added and stirred at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became viscous during the high temperature step. The completion of the reaction was confirmed by proton NMR. The reaction product was also analyzed by FTIR, which did not show an absorption band for free lactide. GPC gave a Gaussian-shaped unimodal curve corresponding to the targeted molecular weight. The resulting product was a clear and highly viscous material at room temperature.

Example 16

A silicone polyether-co-caprolactone-co-lactide copolymer with the average structure $(CH_3)_3SiO(Si(CH_3)_2O)_{87}(Si(RP^{pcd})(CH_3)O)_{4.4}Si(CH_3)_3$, wherein $R^{pcd}$ is a polyether-co-lactone-co-lactide radical having the average formula —$CH_2CH_2CH_2O(CH_2CH_2O)_{18}(C(O)CH(CH_3)O)_{10}(C(O)(CH_2)_4O)_6H$, was prepared as follows: To a three-necked round bottom flask; equipped with a thermometer, a condenser with positive dry nitrogen flow and a stirrer there was added 25 g of a polyether siloxane copolymer of Example 7. Then 9 g of dl-dilactide, 8.5 g of ε-Caprolactone and 0.05% of stannous octanoate relative to the total amount of reactants were added and stirred at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became highly viscous during the high temperature step. The completion of the reaction was confirmed by proton NMR. The reaction product was also analyzed by FTIR, which did not show an absorption band for free lactide/lactone. GPC gave a Gaussian-shaped unimodal curve corresponding to the targeted molecular weight. The resulting product was a clear and highly viscous material at room temperature.

Example 17

A silicone polyether-co-lactide copolymer with the average structure $(CH_3)_3SiO(Si(CH_3)_2O)_{77}(Si(R^{pc})(CH_3)O)_{8.85}Si(CH_3)_3$, wherein $R^{pc}$ is a polyether-co-caprolactone radical having the average formula $-CH_2CH_2CH_2O(CH_2CH_2O)_{18}(C(O)(CH_2)_4O)_{12}H$, was prepared as follows: In a similar set of equipment, as mentioned in Example 11, 60 g of a polyether siloxane copolymer of Example 8, 51.67 g ε-Caprolactone and 0.05% of Stannous octanoate relative to the total amount of reactants were added and stirred at 80° C. for 2 hr. The reaction bath temperature was increased to 150° C. and the reaction mass was held at this temperature for 4 hrs. It was observed that the reaction mixture was an opaque, immiscible blend at the beginning of the reaction, which progressively became clearer during the high temperature step. The completion of the reaction was confirmed by proton NMR and solid weight analysis at 150° C. for 10 min at the beginning and end of the reaction. The reaction product was also analyzed by FTIR, which did not show an absorption band for lactones. GPC gave a gaussian-shaped unimodal curve corresponding to the targeted molecular weight. DSC showed the melting peak at 43° C. The resulting product was a hard and opaque solid at room temperature.

Example 18

A silicone polyether-co-lactide copolymer with the average structure $(CH_3)_3SiO(Si(CH_3)_2O)_{77}(Si(R^{pd})(CH_3)O)_{8.85}Si(CH_3)_3$, wherein $R^{pd}$ is a polyether-co-lactide radical having the average formula $-CH_2CH_2CH_2O(CH_2CH_2O)_{18}(C(O)CH(CH_3)O)_{18}H$, was prepared as follows: In a three-necked round bottom flask; equipped with a thermometer, a condenser with positive dry nitrogen flow and a stirrer; 50 g of a polyether siloxane copolymer of Example 8, 48 g dl-dilactide, 10% of toluene and 0.05% of stannous octanoate relative to the total amount of reactants were added and stirred at 80° C. for 2 hr. The reaction bath temperature was increased to 150° C. and the reaction mass was held at this temperature for 4 hrs. It was observed that the reaction mixture was a low viscous liquid at the beginning of the reaction, which progressively became viscous during the high temperature step. The completion of the reaction was confirmed by proton NMR. The reaction product was also analyzed by FTIR, which did not show an absorption band for the free lactide. GPC gave a gaussian-shaped unimodal curve corresponding to the targeted molecular weight. The resulting product was a clear and highly viscous material at room temperature.

Example 19

A silicone polyether-co-caprolactone-co-lactide copolymer with the average structure $(CH_3)_3SiO(Si(CH_3)_2O)_{77}(Si(R^{pcd})(CH_3)O)_{8.85}Si(CH_3)_3$, wherein $R^{pcd}$ is a polyether-co-lactone-co-lactide radical having the average formula $-CH_2CH_2CH_2O(CH_2CH_2O)_{18}(C(O)CH(CH_3)O)_{10}(C(O)(CH_2)_4O)_6H$, was prepared as follows: In a three-necked round bottom flask; equipped with a thermometer, a condenser with positive dry nitrogen flow and a stirrer; 40 g of a polyether siloxane copolymer of Example 8 were added. To this 21 g dl-dilactide, 20 g ε-Caprolactone and 0.05% of stannous octanoate relative to the total amount of reactants were added and stirred at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became highly viscous during the high temperature step. The completion of the reaction was confirmed by proton NMR. The reaction product was also analyzed by FTIR, which did not show an absorption band for the free dl-dilactide/lactone. GPC gave a gaussian-shaped unimodal curve corresponding to the targeted molecular weight. The resulting product was a clear and highly viscous material at room temperature.

Example 20

A silicone polyether-co-caprolactone copolymer with the average structure $(CH_3)_3SiO(Si(CH_3)_2O)_{70}(Si(R^{pc})(CH_3)O)_{4.9}Si(CH_3)_3$, wherein $R^{pc}$ is a polyether-co-caprolactone radical having the average formula $-CH_2CH_2CH_2O(CH_2CH_2O)_{18}(C(O)(CH_2)_4O)_{11}H$, was prepared as follows: In similar set of equipment, as mentioned in the example 12, 50 g of a polyether siloxane copolymer of Example 9 were added. To this 38 g ε-caprolactone and 0.05% of stannous octanoate relative to the total amount of reactants were added and stirred at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became highly viscous during the high temperature step. The completion of the reaction was confirmed by proton NMR and solid weight analysis at 150° C. for 10 min at the beginning and end of the reaction. The reaction product was also analyzed by FTIR, which did not show a free lactones peak. GPC gave a gaussian-shaped unimodal curve corresponding to the targeted molecular weight. DSC showed the melting peak at 43° C. The resulting product was a hard and opaque solid at room temperature.

Example 21

A silicone polyether-co-lactide copolymer with the average structure $(CH_3)_3SiO(Si(CH_3)_2O)_{70}(Si(R^{pd})(CH_3)O)_{4.9}Si(CH_3)_3$, wherein $R^{pd}$ is a polyether-co-lactide radical having the average formula $-CH_2CH_2CH_2O(CH_2CH_2O)_{18}(C(O)CH(CH_3)O)_{18}H$, was prepared as follows: In a three-necked round bottom flask; equipped with a thermometer, a condenser with positive dry nitrogen flow and an overhead stirrer; 40 g of a polyether siloxane copolymer of Example 9 were added and to this 32 g dl-dilactide, 10% of toluene and 0.05% of stannous octanoate relative to the total amount of reactants were added followed by stirring at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became viscous during the high temperature step. The completion of the reaction was confirmed by proton NMR. The reaction product was also analyzed by FTIR, which did not show an absorption band for the free lactide. GPC gave a gaussian-shaped unimodal curve corresponding to the targeted molecular weight. The resulting product was a clear and highly viscous material at room temperature.

Example 22

A silicone polyether-co-caprolactone-co-lactide copolymer with the average structure $(CH_3)_3SiO(Si(CH_3)_2O)_{70}(Si(R^{pcd})(CH_3)O)_{4.9}Si(CH_3)_3$, wherein $R^{pcd}$ is a polyether-co-lactone-co-lactide radical having the average formula —$CH_2CH_2CH_2O$—$(CH_2CH_2O)_{18}(C(O)CH(CH_3)O)_{10}(C(O)(CH_2)_4O)_5H$, was prepared as follows: In a three-necked round bottom flask; equipped with a thermometer, a condenser with positive dry nitrogen flow and a stirrer; 40 g of a polyether siloxane copolymer of Example 9 were added. To this 17.4 g dl-dilactide, 13.8 g ε-caprolactone and 0.05% of stannous octanoate relative to the total amount of reactants were added and stirred at 80° C. for 2 hrs. The reaction bath temperature was increased to 150° C. and the reaction mass was held at this temperature for 4 hrs. It was observed that the reaction mixture was a low viscous liquid at the beginning of the reaction, which progressively became highly viscous during the high temperature step. The completion of the reaction was confirmed by proton NMR. The reaction product was also analyzed by FTIR, which did not show an absorption band for the free dl-dilactide/lactone. GPC gave a gaussian-shaped unimodal curve corresponding to the targeted molecular weight. The resulting product was a clear and highly viscous material at room temperature.

Example 23

A silicone polyether-co-caprolactone copolymer with the average structure $(CH_3)_3Si(OSi(CH_3)_2)_{20}(OSi(R^{pc})(CH_3))_{3.2}OSi(CH_3)_3$, wherein $R^{pc}$ is a polyether-co-caprolactone copolymer having the average formula —$CH_2CH_2CH_2O(CH_2CH_2O)_{7.4}(C(O)(CH_2)_4O)_2H$, was prepared as follows: In a similar set of equipment, mentioned in Example 12, 53 g of a polyether siloxane copolymer of Example 10 were added. To this 10 ε-caprolactone and 0.05% of stannous octanoate relative to the total amount of reactants were added and stirred at 80° C. for 2 hr. The reaction bath temperature was increased to 150° C. and the reaction mass was held at this temperature for 4 hrs. It was observed that the reaction mixture was a low viscous liquid at the beginning of the reaction, which progressively became highly viscous during the high temperature step. The completion of the reaction was confirmed by proton NMR and solid weight analysis at 150° C. for 10 min at the beginning and end of the reaction. The reaction product was also analyzed by FTIR, which did not show an absorption band for the lactones. GPC gave a gaussian-shaped unimodal curve corresponding to the targeted molecular weight. DSC showed the melting peak at 43° C. The resulting product was a hard and opaque solid at room temperature.

Example 24

Polymethylhydrogen-co-dimethylsiloxane fluid with the average formula $(CH_3)_3Si(OSi(CH_3)_2)_{87}(OSi(H)(CH_3))_{8.5}OSi(CH_3)_3$ was prepared by acid catalyzed ring-opening polymerization of polymethyl hydrogen siloxane with the average formula $(CH_3)_3Si(OSi(H)(CH_3))_{36}OSi(CH_3)_3$, hexamethyldisiloxane (MM) and octamethylcyclotetrasiloxane ($D_4$) using concentrated $H_2SO_4$. The reaction was carried out by mixing 20.4 g of $(CH_3)_3Si(OSi(H)(CH_3))_{36}OSi(CH_3)_3$, 4.35 g hexamethyldisiloxane and 225.5 g, octamethylcyclotetrasiloxane ($D_4$) and 2% of $H_2SO_4$ of total reaction mass for 4 hrs, at ambient temperature, in a round bottom flask fitted with a condenser and stirring. After 4 hrs the acid was neutralized with 32g $NaHCO_3$ and the salt was filtered out from the reaction mass. The final non-volatile content of the reaction mass was 90% 150° C. The average structure was determined by $Si^{29}$-NMR.

Example 25

A polydimethyl-co-methylpolyether-co-methyl-propylalcohol-siloxane copolymer with the average structure $(CH_3)_3SiO(Si(CH_3)_2O)_{87}(Si(R^A)(CH_3)O)_{4.3}(Si(R^P)(CH_3)O)_{4.2}Si(CH_3)_3$, wherein $R^A$ is a propyl alcohol group and $R^P$ is a polyether group having the average formula —$CH_2CH_2CH_2O(CH_2CH_2O)_{18}C(O)CH_3$, was prepared as follows: In a three-necked round bottom flask; equipped with a thermometer, a condenser with positive dry nitrogen flow and a stirrer; 60 g of silanic hydrogen fluid from example 24 was hydrosilylated with 37.7 g of an allyl-started polyether with the average structure $CH_2$=$CHCH_2O(CH_2CH_2O)_{18}C(O)CH_3$ at 90° C. using 10 ppm of Karstedt's catalyst. Once the polyether reacted completely, 5.1 g of allyl alcohol was added at 80° C. to react with the remaining hydrides and reaction was held at 80° C. for another 3 hours at which point it was determined by Proton-NMR that all of the hydride was consumed. The reaction product was stored in a bottle after cooling it to room temperature.

Example 26

A poly-(dimethyl-co-methylpolyether-co-methylpolycaprolactone)siloxane copolymer with the average structure $(CH_3)_3SiO(Si(CH_3)_2O)_{87}(Si(R^C)(CH_3)O)_{4.3}(Si(R^P)(CH_3)O)_{4.2}Si(CH_3)_3$ was prepared, wherein $R^C$ is a polycaprolactone group having the average formula —$CH_2CH_2CH_2O(C(O)(CH_2)_5O)_{11}H$ and $R^P$ is a polyether group having the average formula —$CH_2CH_2CH_2O(CH_2CH_2O)_{18}C(O)CH_3$, as follows: In a three-necked round bottom flask equipped with a thermometer, a condenser with positive dry nitrogen flow and a stirrer; 57.9 g of siloxane copolymer of Example 25, 32.1 g of ε-caprolactone and 0.05% of stannous octanoate relative to the total amount of reactants were added and stirred at 80° C. for 2 hrs. The reaction bath temperature was then increased to 150° C. and the reaction mass was held at this temperature for 4 hrs. It was observed that the reaction mixture was an opaque, immiscible blend at the beginning of the reaction, which progressively became clearer during the high temperature step. The completion of the reaction was confirmed by proton NMR and solid weight analysis at 150° C. for 10 min, at the beginning and in the end of reaction, respectively. The reaction product was analyzed by FTIR, which did not show an absorbance band for free lactones. The resulting product was a soft and opaque solid at room temperature.

Example 27

A poly(dimethyl-co-methylpolyether-co-methylpolylactide)siloxane copolymer with the average structure $(CH_3)_3SiO(Si(CH_3)_2O)_{87}(Si(R^L)(CH_3)O)_{4.3}(Si(R^P)(CH_3)O)_{4.2}Si(CH_3)_3$ was prepared, wherein $R^L$ is a polylactide group having the average formula —$CH_2CH_2CH_2O(C(O)CH(CH_3)O)_{18}H$ and $R^P$ is a polyether group having the average formula —$CH_2CH_2CH_2O(CH_2CH_2O)_{18}C(O)CH_3$, as follows: In a three-necked round bottom flask equipped with a thermometer, a condenser with positive dry nitrogen flow and a stirrer; 48.6 g of siloxane copolymer of Example 25, 27.8 g of d,l- dilactide, 10% toluene and 0.05% of stannous octanoate relative to the total amount of reactants were taken and stirred at 80° C. for 2 hrs. The reaction bath temperature was then increased to 150° C. and the reaction mass was held at this temperature for 4 hrs. It was observed that the reaction mixture was a low viscous liquid at the beginning of the reaction, which progressively became viscous during the high temperature step. The completion of the reaction was confirmed by proton NMR. The reaction product was analyzed by FTIR, which did not show an absorbance band for free dilactide. The resulting product was a clear and highly viscous liquid at room temperature.

Demulsifier Efficiency Tests with Crude Oils:

The following examples test the various silicones structures of the present disclosure, in combinations with organic demulsifiers that will be described.

ORG A, ORG B, ORG C and ORG D are commercial organic demulsifier packages currently used at the field and they all contained ethoxylated phenolic resins and polyglycol esters.

DMO46 was a knock-out dropper demulsifier package from Baker Petrolite, Sugar Land, Tex., USA.

Demulsification Test with Crude Oil:

Crude oil A and crude oil B were from the Middle East and they were collected daily in a 25 Liter tank directly after the gas-oil separator before the demulsifier injection point. Without any demulsifier addition the emulsion was found to be stable in that there was no free water separation even after one day of standing.

Crude oil A was from Middle East offshore wells, had an °API gravity of 25, a water cut of ca. 38%, a low $H_2S$ content and contained a few ppm of polydimethylsiloxane (PDMS) with 30,000 cSt viscosity as antifoam Crude oil B was also from Middle East wells, had an °API gravity of 15, a water cut of ca. 18%, a low $H_2S$ content and contained a few ppm of polydimethylsiloxane (PDMS) with 30,000 cSt viscosity as antifoam.

Demulsifier Blends:

Blends of silicones and various organic demulsifier packages are provided in Table 1a. The best blends in Table 1a are determined by the higher percentage of water separated after 30 min (at 60° C.) (Free water in the Top Cut method), and according to the dryness of the top oil phase (Free water in the Mixed Cut method).

Test Procedure with Crude Oil A:

The crude sample was homogenized by first heating it to about 40° C. and then thoroughly shaking the container by hand for several minutes. One hundred grams of crude oil emulsion was carefully poured into prescription glass bottles, which had marks at 10 ml intervals ("San-Glas Ovals-Flint", made by Owen-Brockway, Ill., USA) and threaded cap. The silicone and organic demulsifiers were diluted to 10% with xylene and then the required amount of these solutions were added to the crude oil emulsions in the bottles. First, the bottles with the crude oil sample and demulsifier were heated for 5 min in a water bath, which was at 60° C. Then the bottles were flipped twice, followed by shaking them with a Barnstead/Labline Max 2000 orbital shaker for 5 min, at 100 shakes/min rate and then placing the bottles back to the bath at 60° C. After 15 minute the bottles were gently flipped, horizontally, twenty times to break up the "bags" at the interface. In predetermined intervals, as indicated in the tables 1a, 1b, 1c and 1d, the bottles were taken out of the water bath and the quality of the water/crude oil interface was inspected and the volume in percent (%) of the separated water phase was measured. The water content of the separated crude oil was measured with two methods:

Top Cut: A sample was extracted from the 80 mL mark on the bottle with a syringe and then poured up to the 100% mark of 12.5 ml Kimble, graduated, conical-bottom glass centrifuge tubes which had been filled with xylene to the 50% mark and then shaken by hand. The diluted samples were centrifuged for five minutes at 2500 rpm with an IEC HN-SII centrifuge. The volume of separated water ("Free water") and the volume of the emulsion phase between the separated water and oil phases (called "BS" or "Bottom sediment") were recorded. The amount of "Total water" after separation was measured by adding 1-2 drops of a knockout dropper (DMO46 obtained from Baker Hughes, Sugar Land, Tex., USA) to the centrifuged emulsions, followed by re-mixing the liquid in the tube and then centrifuging and reading the level of the separated water again as described above. The "Emulsion" content of the crude was calculated by subtracting the "Free water" content from the "Total water" content.

Mixed Cut: After the predetermined duration in the water baths, as indicated in tables, the bottles were taken out and carefully the separated water was removed with the help of a syringe without disturbing the interface. This was followed by a thorough mixing of the content in the bottle to homogenize the resolved crude. A sample was extracted from this oil phase with a syringe and then poured into 12.5 ml Kimble conical-bottom glass centrifuge tubes up to the 50% mark and then diluted up to 100% with toluene. The diluted samples were centrifuged for five minutes at 2500 rpm with an IEC HN-SII centrifuge. The amount of separated water and bottom sediments were recorded ("Free water", "BS"). The amount of "Total water" was measured by adding 1-2 drops of knockout dropper (DMO46) and mixing the emulsion and heating it up in a water bath followed by centrifugation as above. The "Emulsion" content of the crude was calculated by subtracting the "Free water" content from the "Total water" content.

Test Procedure with Crude Oil B:

Tests with crude oil B were carried out as described for crude oil A. The only change was duration of separation as indicated in Table-2a.

TABLE-1a

Bottle tests with crude oil A at 60° C., for 30 mins.

| Demulsifier | Dose (ppm) | Water separation (%) | | | | Top Cut (%) | | | Mixed Cut (%) | | |
|---|---|---|---|---|---|---|---|---|---|---|---|
| | | 5 min | 10 min | 15 min | 30 min | % Free water | % Total water | % Emulsion | % Free water | % Total water | % Emulsion |
| Blank | 0 | 0 | 0 | 0 | 0 | 9 | 38 | 29 | | | |
| Org A | 50 | 11 | 15 | 18 | 18 | 9 | 15 | 6 | 10 | 18 | 8 |

TABLE-1a-continued

Bottle tests with crude oil A at 60° C., for 30 mins.

| Demulsifier | Dose (ppm) | Water separation (%) 5 min | 10 min | 15 min | 30 min | Top Cut (%) % Free water | % Total water | % Emulsion | Mixed Cut (%) % Free water | % Total water | % Emulsion |
|---|---|---|---|---|---|---|---|---|---|---|---|
| Org A + Example 11 | 50 + 2.5 | 15 | 17 | 20 | 20 | 7 | 11 | 4 | 7 | 12 | 5 |
| Org A + Example 12 | 50 + 2.5 | 13 | 15 | 17 | 19 | 10 | 15 | 5 | 11 | 18 | 7 |
| Org A + Example 13 | 50 + 2.5 | 15 | 16 | 18 | 18 | 11 | 20 | 9 | 4 | 16 | 12 |
| Org A + Example 14 | 50 + 2.5 | 12 | 15 | 17 | 18 | 7 | 11 | 4 | 8 | 12 | 4 |
| Org A + Example 15 | 50 + 2.5 | 13 | 16 | 19 | 20 | 11 | 16 | 5 | 9.5 | 16 | 6.5 |

TABLE-1b

Bottle tests with crude oil A at 60° C., for 30 mins.

| Demulsifier | Dose (ppm) | Water separation (%) 5 min | 10 min | 15 min | 30 min | Top Cut % Free water | % Total water | % Emulsion | % BS | Mixed Cut % Free water | % Total water | % Emulsion | % BS |
|---|---|---|---|---|---|---|---|---|---|---|---|---|---|
| Blank | 0 | 0 | 0 | 0 | 0 | 9 | 38 | 29 | nm | nm | nm | nm | nm |
| Org D | 50 | 8 | 15 | 16 | 18 | 8 | 19 | 11 | 10 | 10 | 18 | 8 | 8 |
| Org D + Example 11 | 50 + 2.5 | 12 | 20 | 20 | 22 | 10 | 19 | 9 | 8 | 10 | 18 | 8 | 6 |
| Org D + Example 14 | 50 + 2.5 | 7 | 14 | 17 | 21 | 7 | 15 | 8 | 7 | 6 | 16 | 8 | 7 | nm: not measured

TABLE-1c

Bottle tests with crude oil A at 60° C., for 30 mins

| Demulsifier | Dose (ppm) | Water separation (%) 5 min | 10 min | 15 min | 30 min | Top Cut % Free water | % Total water | % Emulsion | % BS |
|---|---|---|---|---|---|---|---|---|---|
| Blank | 0 | 0 | 0 | 0 | 0 | 9 | 36 | 27 | nm |
| Org D | 50 | 5 | 15 | 20 | 21 | 9 | 17 | 8 | 7 |
| Org D + Example 11 | 50 + 1.25 | 10 | 18 | 22 | 22 | 7 | 18 | 11 | 10 |
| Org D + Example 12 | 50 + 1.25 | 12 | 18 | 22 | 23 | 6 | 17 | 11 | 9 |
| Org D + Example 13 | 50 + 1.25 | 8 | 14 | 20 | 20 | 8 | 17 | 9 | 8 |
| Org D + Example 14 | 50 + 1.25 | 10 | 20 | 22 | 23 | 4.4 | 13 | 8.6 | 7.6 |
| Org D + Example 15 | 50 + 1.25 | 15 | 20 | 22 | 23 | 8 | 19 | 11 | 8 |

TABLE-1d

Bottle tests with crude oil A at 40° C., for 24 hours

| Demulsifier | Dose (ppm) | Water separation (%) 24 hr | Top Cut % Free water | % Total water | % Emulsion | % BS |
|---|---|---|---|---|---|---|
| Blank | 0 | 0 | 9 | 37 | 28 | nm |
| Org D | 50 | 20 | 1 | 16 | 15.2 | nm |
| Org D | 35 | 16 | 2.4 | 23 | 20.6 | nm |
| Org D + Example 14 | 35 + 0.9 | 17 | 2 | 15 | 13 | nm | nm: not measured

TABLE-2A

Bottle tests with crude oil B at 60° C., for 3 hours.

| Example | Dose (ppm) | Water separation (%) 3 hr | Top Cut (After 3 hours) | | | Mixed Cut (After 3 hours) | | |
|---|---|---|---|---|---|---|---|---|
| | | | % Free water | % Total water | % Emulsion | % Free water | % Total water | % Emulsion |
| Crude oil B | 0 | 0 | 3.2 | 18 | 14.8 | nm | nm | nm |
| Org C | 100 | 6 | 11 | 15 | 4 | 11 | 14 | 3 |
| Org C + Example 11 | 70 + 1.87 | 9 | 11 | 14 | 3 | 11 | 14 | 3 |
| Org C + Example 12 | 70 + 1.87 | 6 | 14 | 16 | 2 | 12 | 15 | 3 |
| Org C + Example 13 | 70 + 1.87 | 6 | 9 | 14 | 5 | nm | nm | nm |
| Org C + Example 14 | 70 + 1.87 | 5 | 12 | 14 | 2 | 13 | 15 | 2 |
| Org C + Example 15 | 70 + 1.87 | 5 | 8 | 12 | 4 | nm | nm | nm |
| Org D | 100 | 5 | 10 | 14 | 4 | 12 | 17 | 5 |
| Org D + Example 11 | 70 + 1.87 | 4 | 10 | 16 | 6 | nm | nm | nm |
| Org D + Example 12 | 70 + 1.87 | 9 | 9 | 15 | 6 | nm | nm | nm |
| Org D + Example 13 | 70 + 1.87 | 5 | 10 | 15 | 5 | nm | nm | nm |
| Org D + Example 14 | 70 + 1.87 | 4 | 7 | 10 | 3 | 8 | 13 | 5 |
| Org D + Example 15 | 70 + 1.87 | 5 | 7 | 11 | 4 | nm | nm | nm | nm = not measured

Biodegradability Tests:
Test Protocol

Biodegradability tests were performed according to OECD 306 guidelines, and these were carried out at the laboratories of OPUS Plus Ltd, UK. The method employed no separate bacterial innoculum, and relied upon populations of bacteria that occur naturally in seawater. The test served only to provide a preliminary level of information on ready degradability in seawater. The raw seawater used for this study was supplied by a submersible pump situated on Sutherland's pier on the west side of Flotta in Scapa Flow. It was pumped continuously from a depth of two meters below low water spring tide level, before passing up 1.8 kilometers of plastic pipe to a 20,000 liter storage tank. Two smaller pumps moved the water to three settlement tanks situated nine meters above floor level. The seawater temperature varied between 6° C. in the winter and 14° C. in the summer. The salinity was between 34% and 37%. Five to seven days before the test commencement, the raw seawater passed by gravity through a 45 μm filter to the ageing tank which was stored in darkness.

The overall assessment of biodegradability was based upon a comparison between experimentally determined oxygen consumption (BOD, Biological Oxygen Demand measurements) and the oxygen consumption predicted if all carbon present in the test material were completely oxidized (theoretical oxygen demand, (ThOD)). Where the composition of the test material is known, or can be reasonably inferred, the ThOD can be calculated from the empirical formula and the molecular weight. If neither the empirical formula nor chemical composition of the test material can be obtained, then the prediction of maximum potential BOD is obtained from the determination of the chemical oxygen demand (COD).

The Chemical Oxygen Demand (COD) analysis of soluble test materials were derived by using a COD Colorimeter The COD values obtained are used directly in calculating the addition rates of the titrating solution. For insoluble test materials a CHN (carbon:hydrogen:nitrogen) analysis is applied The empirical formula for most organic test materials can be derived by this method (excluding muds). The theoretical oxygen demand (ThOD) in mg of oxygen per mg of test substance can be calculated from the empirical formula and molecular weight of the test substance.

Oxygen consumption in test material vessels is corrected for variation in atmospheric pressure, and for any oxygen consumption recorded in blank vessels. A readily degradable soluble reference material, sodium benzoate, is used to provide confirmation of the viability of the naturally occurring seawater bacterial population.

To enable an assessment of potential inhibitory effects of the test material (or its primary degradation products), an inhibition control is used, in which a mixture of the soluble reference compound and the test material is tested. Inhibition is inferred if the degradation rate of the mixture is less than the sum of the independent degradation rates.

Sea Water Data:

| Parameters | Data |
|---|---|
| Source | Sutherland Pier, Scapa Flow |
| Date of collection: | 31 Mar. 2009 |
| Depth of collection: | 2 m below low water Spring tide level |
| Volume collected: | 100 liters |
| Appearance at collection: | Clear |
| Salinity at collection (%): | 35 |
| Temperature at collection (° C.): | 16.5 |
| Temperature on day zero (° C.): | 20.6 |
| Pretreatment prior to testing: | Filtered through 0.45 μm, phosphate based nutrient enriched sedimentation and decanted Aged in darkness for: 6 days Aerated for: 10 minutes |
| Microbial count at collection (CFU/ml): | $2.38 \times 10^2$ |
| Microbial count on day zero (CFU/ml): | $6.26 \times 10^4$ |

Test Results

TABLE 3

Biodegradability of various examples based on OECD 306 guidelines, after deducting the blank sample reading.

| Compounds | % Biodegradability (OECD 306) | | | |
|---|---|---|---|---|
| | 7th day | 14th day | 21st day | 28th day |
| Comp. Example 10 | 1 | 2 | 4 | 8 |
| Example 23 | 11 | 18 | 20 | 18 |

Table 3 demonstrates that Example 23, which contains one of the inventive polyorganosiloxanes (b) has a significantly improved biodegradability than comparative Example 10 silicone polyether (which contains no $R^L$ group).

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A demulsifying composition comprising an oil phase, and aqueous phase and a demulsifying-effective amount of at least one polyorganosiloxane compound having the general formula (I):

$$M^1{}_a M^2{}_b D^1{}_c D^2{}_d T^1{}_e T^2{}_f Q_g \quad (I)$$

wherein:
$M^1 = R^1 R^2 R^3 SiO_{1/2}$,
$M^2 = R^4 R^5 R^L SiO_{1/2}$,
$D^1 = R^6 R^7 SiO_{2/2}$,
$D^2 = R^8 R^L SiO_{2/2}$,
$T^1 = R^9 SiO_{3/2}$,
$T^2 = R^L SiO_{3/2}$,
$Q = SiO_{4/2}$, where $R^1$, $R^2$, $R^3$, $R^4$, $R^5$, $R^6$, $R^7$, $R^8$ and $R^9$ are each independently chosen from monovalent alkyl, aryl or aralkyl hydrocarbon radicals containing 1 to 60 carbon atoms, optionally containing at least one heteroatom, or at least one monovalent polyether radical having the general formula $R^P$;

$R^P$ is a monovalent polyether radical independently of the general formula (II):

$$-(C_nH_{2n})-O-(C_2H_4O)_o-(C_3H_6O)_P-(C_4H_8O)_q-R^{10} \quad (II)$$

where $R^{10}$ is hydrogen or a monovalent alkyl radical containing from 1 to about 20 carbon atoms or an acyl group;

subscripts a, b, c, d, e, f and g are zero or positive integers, subject to the limitations: $2 \leq a+b+c+d+e+f+g \leq 500$, $b+d+f \geq 1$ and $a+b=2+e+f+2g$;

subscript n is 2 to about 10;
subscript o is 0 to about 200;
subscript p is 0 to about 200;
subscript q is 0 to about 200; and,
subject to the limitation $o+p+q \geq 1$;

$R^L$ is a monovalent radical independently chosen from the general formula (III):

$$-X-O-(C_2H_4O)_r-(C_3H_6O)_s-(C_4H_8O)_t-\{C(O)C_uH_{2u}O\}_v-R^{11} \quad (III)$$

where $R^{11}$ is hydrogen or monovalent alkyl radical containing from 1 to about 20 carbon atoms or an acyl group, and where X is a linear, branched or cyclic divalent hydrocarbon or aralkyl radical containing from 2 to about 20 carbon atoms, optionally containing at least one heteroatom;

subscript r is 0 to about 200;
subscript s is 0 to about 200;
subscript t is 0 to about 200;
subscript u is 1 to about 20;
subscript v is 1 to about 200, and
subject to the limitation if $r+s+t$ is equal to zero then the polyorganosiloxane contains at least one $R^P$ radical.

2. The demulsifying composition of claim 1,
wherein $R^1$, $R^2$, $R^3$, $R^4$, $R^5$, $R^6$, $R^7$, $R^8$ and $R^9$ are each independently chosen from monovalent alkyl, aryl or aralkyl hydrocarbon radicals containing from 1 to about 20 carbon atoms, optionally containing at least one heteroatom, or chosen from $R^P$;

$R^{10}$ is hydrogen or a monovalent alkyl radical containing from 1 to about 10 carbon atoms or an acyl group;

subscript n is 3 to about 10;
subscript o is 0 to about 100;
subscript p is 0 to about 100;
subscript q is 0 to about 50;

$R^{11}$ is hydrogen or a monovalent alkyl radical containing from 1 to about 10 carbon atoms or an acyl group;

subscript r is 0 to about 100;
subscript s is 0 to about 100;
subscript t is 0 to about 50;
subscript u is 1 to about 15; and,
subscript v is 1 to about 100.

3. The demulsifying composition of claim 1,
wherein $R^1$ is selected from the group consisting of $CH_3$, OH, $OCH_3$ or $OC_2H_5$;

$R^2$, $R^3$, $R^6$, $R^7$ and $R^9$ are each independently selected from the group consisting of $CH_3$ or $R^P$;

$R^4$, $R^5$ and $R^8$ are each independently selected from the group consisting of $CH_3$;

$R^{10}$ is selected from the group consisting of hydrogen, a monovalent alkyl radical containing 1 to about 8 carbon atoms, or an acyl group;

subscript n is 3 to about 6;
subscript o is 0 to about 50;
subscript p is 0 to about 50; and,
subscript q is 0 to about 10;

$R^{11}$ is selected from the group consisting of hydrogen or a monovalent alkyl radical containing from 1 to about 8 carbon atoms or an acyl group;

subscript r is 0 to about 50;
subscript s is 0 to about 25;
subscript t is 0 to about 10;
subscript u is 1 to about 10; and,
subscript v is 1 to about 50.

4. The demulsifying composition of claim 1, wherein the polyorganosiloxane compound (b) has the general formula (IV):

$$M^1{}_a M^2{}_b D^1{}_c D^2{}_d \quad (IV)$$

where
$M^1 = R^{12} R^{13} R^{14} SiO_{1/2}$,
$M^2 = R^{15} R^{16} R^L SiO_{1/2}$,
$D^1 = R^{17} R^{18} SiO_{2/2}$,
$D^2 = R^{19} R^L SiO_{2/2}$, wherein, $R^{12}$, $R^{13}$, $R^{14}$, $R^{15}$, $R^{16}$, $R^{17}$, $R^{18}$ and $R^{19}$ are each independently chosen from monovalent alkyl, aryl or aralkyl hydrocarbon radicals containing 1 to 60 carbon atoms;

subscripts a, b, c and d are zero or positive integers, subject to the limitations: $2 \leq a+b+c+d \leq 500$, and $b+d \geq 0.1$;

$R^P$ is a monovalent polyether radical independently chosen from the general formula (V):

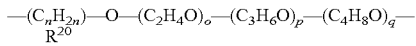
$$—(C_nH_{2n})—O—(C_2H_4O)_o—(C_3H_6O)_p—(C_4H_8O)_q— \atop R^{20} \quad (V)$$

where subscript n is 2 to about 10;
subscript o is 0 to about 200;
subscript p is 0 to about 200;
subscript q is 0 to about 200; and,
subject to the limitation $o+p+q \geq 1$;
$R^{20}$ is hydrogen or monovalent alkyl radical containing from 1 to about 20 carbon atoms or an acyl group;
$R^L$ is a monovalent radical independently chosen from the general formula (VI):

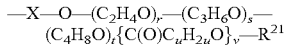
$$—X—O—(C_2H_4O)_r—(C_3H_6O)_s— \atop (C_4H_8O)_t\{C(O)C_uH_{2u}O\}_v—R^{21} \quad (VI)$$

where X is a linear, branched or cyclic divalent hydrocarbon or aralkyl radical containing from 2 to about 20 carbon atoms, optionally containing at least one heteroatom;
$R^{21}$ is hydrogen or a monovalent alkyl radical containing from 1 to about 20 carbon atoms or an acyl group;
subscript r is 0 to about 200;
subscript s is 0 to about 200;
subscript t is 0 to about 200;
subscript u is 1 to about 20;
subscript v is 1 to about 200
subject to the limitation that if r+s+t is equal to zero then the polyorganosiloxane (b) contains at least one $R^P$ radical.

5. The demulsifier composition of claim 4, wherein $R^{12}$, $R^{13}$, $R^{14}$, $R^{15}$, $R^{16}$, $R^{17}$, $R^{18}$ and $R^{19}$ are each independently chosen from a monovalent alkyl, aryl or aralkyl hydrocarbon radical containing from 1 to about 20 carbon atoms;
where subscripts a, b, c and d are zero or positive integers, subject to the limitations: $2 \leq a+b+c+d \leq 500$, and $b+d \geq 1$;
subscript n is 3 to about 10;
subscript o is 0 to about 100;
subscript p is 0 to about 100; and,
subscript q is 0 to about 500;
$R^{20}$ is hydrogen or a monovalent alkyl radical containing from 1 to about 10 carbon atoms or an acyl group;
$R^{21}$ is hydrogen or a monovalent alkyl radical containing from 1 to about 10 carbon atoms or an acyl group;
subscript r is 0 to about 100;
subscript s is 0 to about 100;
subscript t is 0 to about 50;
subscript u is 1 to about 15; and,
subscript v is 1 to about 100.

6. The demulsifier composition of claim 4, wherein $R^{12}$ is selected from the group consisting of $CH_3$, OH, $OCH_3$ or $OC_2H_5$;
$R^{13}$, $R^{14}$, $R^{17}$ and $R^{18}$ are each independently selected from the group consisting of $CH_3$ or $R^P$;
$R^{15}$, $R^{16}$, and $R^{19}$ are each $CH_3$;
subscript n is 3 to about 6;
subscript o is 0 to about 50;
subscript p is 0 to about 50; and,
subscript q is 0 to about 10;
$R^{20}$ is hydrogen or monovalent alkyl radical containing from 1 to about 8 carbon atoms or an acyl group;

$R^{21}$ is hydrogen or a monovalent alkyl radical containing from 1 to about 8 carbon atoms or an acyl group;
subscript r is 0 to about 50;
subscript s is 0 to about 50;
subscript t is 0 to about 10;
subscript u is 1 to about 10; and,
subscript v is 1 to about 50.

7. The demulsifier composition of claim 4, wherein the moiety $\{—C(O)C_uH_{2u}O—\}$ of formula (VI) is independently selected from the group consisting of glycolide $\{—C(O)CH_2O—\}$, lactide $\{—C(O)CH(CH_3)O—\}$, butyrolactide $\{—C(O)CH_2CH_2CH_2O—\}$, caprolactide $\{—C(O)CH_2CH_2CH_2CH_2CH_2O$ radicals and $\{—C(O)CH_2CH_2O—\}$ radicals.

8. The demulsifying composition of claim 1 wherein said composition further comprises one or more additional organic or silicone demulsifier components and the weight ratio of the polyorganosiloxane compound to the total amount of demulsifier and any additional organic demulsifier is in the range of about 100:1 to about 1:1000.

9. The demulsifying composition of claim 1 wherein the concentration of said demulsifying effective amount of polyorganosiloxane compound is from about 0.1 ppm to about 10,000 ppm.

10. The demulsifying composition of claim 1, wherein the polyorganosiloxane compound has sea water biodegradability of at least 18% in 28 days, when tested according to OECD 306 guidelines.

11. The composition of claim 10 wherein the composition is contained in a demulsifying agent for demulsification of mining industrial fluids, demulsification of petroleum industry fluids, demulsification of oil field and refinery fluids, stream assisted gravity drainage, enhanced oil recovery, separation of waste oil and sludge, separation of gas/oil/water fluids, dehazing of lubrication oils and lubrication oil waste, preventing emulsion formation, diesel fuel dehazing, dispersion and drag reduction of asphaltene, and combinations thereof.

12. A method for separating an emulsion comprising:
(i) combining the components of the demulsification composition of claim 1 into a mixture;
(ii) allowing the demulsification composition mixture to separate into at least two phases; and
(iii) separating said at least two phases from each other.

13. The method of claim 12 wherein R1, R2, R3, R4, R5, R6, R7, R8 and R9 are each independently chosen from monovalent alkyl, aryl or aralkyl hydrocarbon radicals containing from 1 to about 20 carbon atoms, optionally containing at least one heteroatom, or chosen from $R^P$;
$R^{10}$ is hydrogen or a monovalent alkyl radical containing from 1 to about 10 carbon atoms or an acyl group;
subscript n is 3 to about 10;
subscript o is 0 to about 100;
subscript p is 0 to about 100;
subscript q is 0 to about 50;
$R^{11}$ is hydrogen or a monovalent alkyl radical containing from 1 to about 10 carbon atoms or an acyl group;
subscript r is 0 to about 100;
subscript s is 0 to about 100;
subscript t is 0 to about 50;
subscript u is 1 to about 15; and,
subscript v is 1 to about 100.

14. The method of claim 12 wherein $R^1$ is selected from the group consisting of $CH_3$, OH, $OCH_3$ and $OC_2H_5$;
$R^2$, $R^3$, $R^6$, $R^7$ and $R^9$ are each independently selected from the group consisting of $CH_3$ and $R^P$;
$R^4$, $R^5$ and $R^8$ are each $CH_3$;

$R^{10}$ is selected from the group consisting of hydrogen, a monovalent alkyl radical containing 1 to about 8 carbon atoms, and an acyl group;

subscript n is 3 to about 6;
subscript o is 0 to about 50;
subscript p is 0 to about 50; and,
subscript q is 0 to about 10;
$R^{11}$ is selected from the group consisting of hydrogen or a monovalent alkyl radical containing from 1 to about 8 carbon atoms and an acyl group;
subscript r is 0 to about 50;
subscript s is 0 to about 25;
subscript t is 0 to about 10;
subscript u is 1 to about 10; and,
subscript v is 1 to about 50.

15. The method of claim 12 wherein component (b) has the general formula (IV):

$$M^1{}_a M^2{}_b D^1{}_c D^2{}_d \qquad (IV)$$

where
$M^1 = R^{12}R^{13}R^{14}SiO_{1/2}$,
$M^2 = R^{15}R^{16}R^L SiO_{1/2}$,
$D^1 = R^{17}R^{18}SiO_{2/2}$,
$D^2 = R^{19}R^L SiO_{2/2}$, wherein, $R^{12}$, $R^{13}$, $R^{14}$, $R^{15}$, $R^{16}$, $R^{17}$, $R^{18}$ and $R^{19}$ are each independently chosen from monovalent alkyl, aryl or aralkyl hydrocarbon radicals containing 1 to 60 carbon atoms;

subscripts a, b, c and d are zero or positive integers, subject to the limitations: $2 \leq a+b+c+d \leq 500$, and $b+d \geq 1$;

$R^P$ is a monovalent polyether radical independently chosen from the general formula (V):

$$-(C_nH_{2n})-O-(C_2H_4O)_o-(C_3H_6O)_p-(C_4H_8O)_q- \atop R^{20} \qquad (V)$$

where subscript n is 2 to about 10;
subscript o is 0 to about 200;
subscript p is 0 to about 200;
subscript q is 0 to about 200; and,
subject to the limitation $o+p+q \geq 1$;
$R^{20}$ is hydrogen or monovalent alkyl radical containing from 1 to about 20 carbon atoms or an acyl group;
$R^L$ is a monovalent radical independently chosen from the general formula (VI):

$$-X-O-(C_2H_4O)_r-(C_3H_6O)_s-(C_4H_8O)_t- \atop \{C(O)C_uH_{2u}O\}_v-R^{21} \qquad (VI)$$

where X is a linear, branched or cyclic divalent hydrocarbon or aralkyl radical containing from 2 to about 20 carbon atoms, optionally containing at least one heteroatom;
$R^{21}$ is hydrogen or a monovalent alkyl radical containing from 1 to about 20 carbon atoms or an acyl group;
subscript r is 0 to about 200;
subscript s is 0 to about 200;
subscript t is 0 to about 200;
subscript u is 1 to about 10;
subscript v is 1 to about 200,
and subject to the limitation that if r+s+t is equal to zero then the polyorganosiloxane (b) contains at least one $R^P$ radical.

16. The method of claim 15 wherein $R^{12}$, $R^{13}$, $R^{14}$, $R^{15}$, $R^{16}$, $R^{17}$, $R^{18}$ and $R^{19}$ are each independently chosen from a monovalent alkyl, aryl or aralkyl hydrocarbon radical containing from 1 to about 20 carbon atoms;

where subscripts a, b, c and d are zero or positive integers, subject to the limitations: $2 \leq a+b+c+d \leq 500$, and $b+d \geq 1$;
subscript n is 3 to about 10;
subscript o is 0 to about 200;
subscript p is 0 to about 200; and,
subscript q is 0 to about 200;
$R^{20}$ is hydrogen or a monovalent alkyl radical containing from 1 to about 10 carbon atoms or an acyl group;
$R^{21}$ is hydrogen or a monovalent alkyl radical containing from 1 to about 10 carbon atoms or an acyl group;
subscript r is 0 to about 100;
subscript s is 0 to about 100;
subscript t is 0 to about 50;
subscript u is 1 to about 15; and,
subscript v is 1 to about 100.

17. The method of claim 15 wherein $R^{12}$ is selected from the group consisting of $CH_3$, OH, $OCH_3$ or $OC_2H_5$;
$R^{13}$, $R^{14}$, $R^{17}$ and $R^{18}$ are each independently selected from the group consisting of $CH_3$ or $R^P$;
$R^{15}$, $R^{16}$, and $R^{19}$ are each $CH_3$;
subscript n is 3 to about 6;
subscript o is 0 to about 50;
subscript p is 0 to about 50; and,
subscript q is 0 to about 10;
$R^{20}$ is hydrogen or monovalent alkyl radical containing from 1 to about 8 carbon atoms or an acyl group;
$R^{21}$ is hydrogen or a monovalent alkyl radical containing from 1 to about 8 carbon atoms or an acyl group;
subscript r is 0 to about 50;
subscript s is 0 to about 50;
subscript t is 0 to about 10;
subscript u is 1 to about 10; and,
subscript v is 1 to about 50.

18. The demulsifier composition of claim 15, wherein the moiety $\{-C(O)C_uH_{2u}O-\}$ of formula (VI) is independently selected from the group consisting of glycolide $\{-C(O)CH_2O-\}$, lactide $\{-C(O)CH(CH_3)O-\}$, butyrolactide $\{-C(O)CH_2CH_2CH_2O-\}$, caprolactide $\{-C(O)CH_2CH_2CH_2CH_2CH_2O-\}$, $\{-C(O)CH_2CH_2CH_2CH_2O-\}$ radicals and $\{-C(O)CH_2CH_2O-\}$ radicals, and where z=0.

19. The method of claim 15, wherein the polyorganosiloxane compound (b) has sea water biodegradability of at least 18% in 28 days, when tested according to OECD 306 guidelines.

* * * * *